United States Patent [19]

Pollastro

[11] Patent Number: 4,623,268

[45] Date of Patent: Nov. 18, 1986

[54] BALL BEARING

[75] Inventor: Giovanni Pollastro, Turin, Italy

[73] Assignee: Riv-Skf Officine Di Villar Perosa S.p.A., Turin, Italy

[21] Appl. No.: 721,691

[22] Filed: Apr. 10, 1985

[30] Foreign Application Priority Data

Apr. 13, 1984 [IT] Italy .................. 53261/84[U]

[51] Int. Cl.[4] .................................. F16C 19/06
[52] U.S. Cl. .............................. 384/511; 384/515
[58] Field of Search ............ 384/511, 513, 515, 510, 384/537

[56] References Cited

U.S. PATENT DOCUMENTS

| | | | |
|---|---|---|---|
| 942,392 | 12/1909 | Koch | 384/511 |
| 1,027,541 | 5/1912 | Hess | 384/511 |
| 3,913,993 | 10/1975 | Ernst | 384/513 |

Primary Examiner—Lenard A. Footland
Attorney, Agent, or Firm—Michael N. Meller

[57] ABSTRACT

A ball bearing has an outer ring and an inner ring with respective rolling tracks for a set of balls, the ball bearing being of the so-called "oblique" type in which the rolling tracks, in section, constitute arcs of a curve the normal to which at the mid point of the curve is inclined at a predetermined angle with respect to the axis of the rings. Adjacent the rolling track on the inner ring is a groove the minimum diameter of which is less than that of the rolling track and adjacent the rolling track of the outer ring is a cylindrical surface the diameter of which is less than the maximum diameter of the rolling track. The difference in diameters between the cylindrical surface and the minimum diameter of the groove is such that half this difference is equal to the diameter of a ball.

2 Claims, 4 Drawing Figures

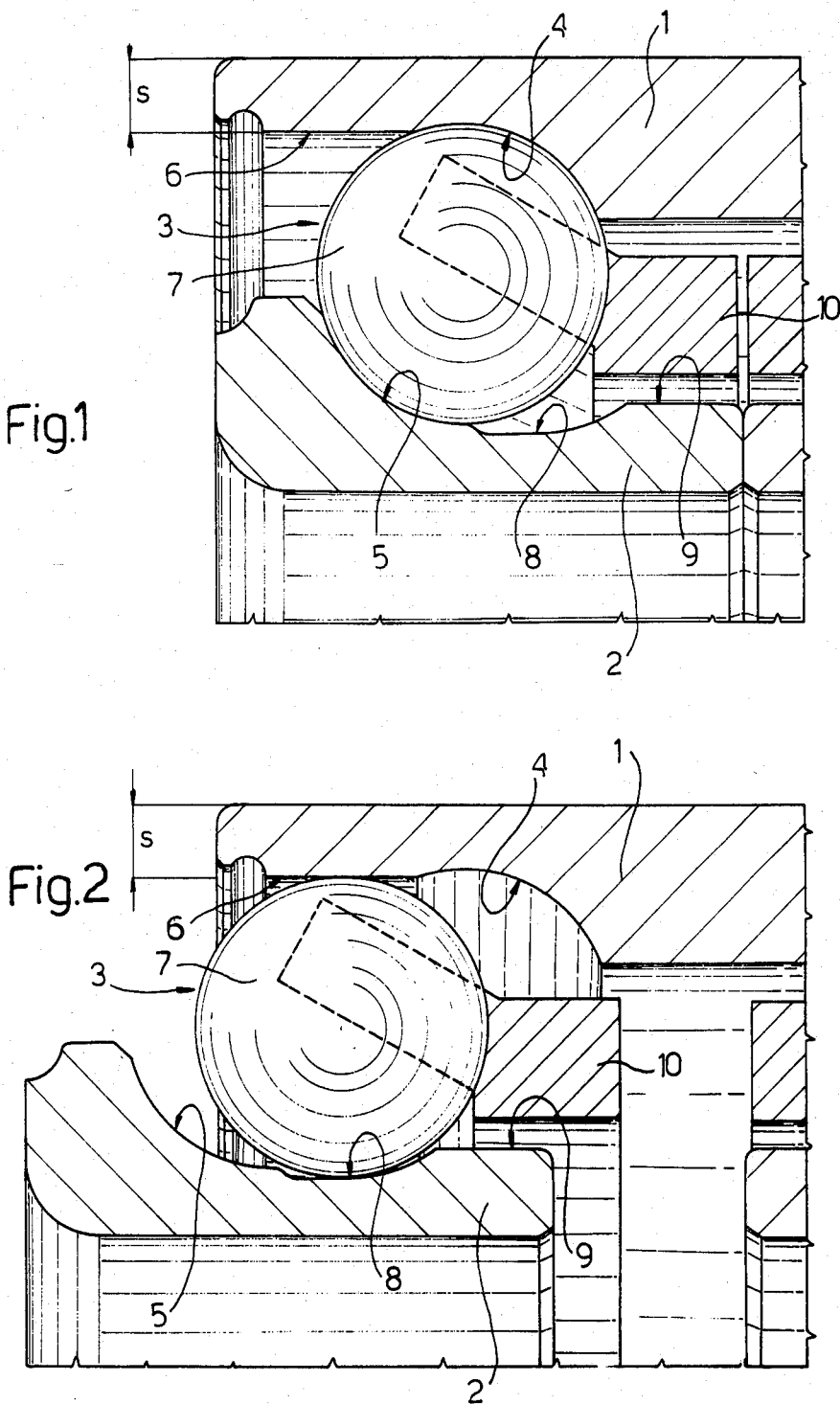

BALL BEARING

BACKGROUND OF THE INVENTION

The present invention relates to a ball bearing with a high load-bearing capacity and of small size, particularly in the radial direction.

The ball bearing of the invention is of the so-called oblique type, that is to say one in which the surface of each rolling track for the balls, in axial section along any line passing through the axis of a ball, is shaped as an arc of a curve the normal to which, taken at the mid point of the curve itself, is inclined by a predetermined angle with respect to the said axis, in such a way that the direction of the forces transferred between each ball and the said track is inclined exactly by this angle with respect to the axis itself.

As is known, to increase the load-bearing capacity of a ball bearing it is necessary to increase the number of balls or their dimension; if the bearing is of the so-called fully filled type, that is to say in which the balls are substantially in contact with one another, it is not possible to increase the number of balls without increasing the diameter of the bearing and therefore, whenever it is desired to obtain such an increase of load-bearing capacity maintaining substantially unchanged the dimensions of the bearing, in particular in a radial sense, the diameter of the balls themselves must be increased. This constructional solution involves, however, having rings, in particular the outer ring, which are particularly thin; in such conditions, because of the reduced thickness of the rings, these are not able effectively to form abutments with the members on which the bearings are mounted or to which they are fixed with respect to the shaft; moreover, such very reduced thicknesses can be the cause of distortions or breakages of the rings themselves during heat treatments to which they are subjected, or whenever such rings fall during mechanical working subsequent to the heat treatment.

SUMMARY OF THE INVENTION

The object of the present invention is to provide a ball bearing of the first mentioned type, which will be free from such disadvantages and which therefore has a high load-bearing capacity with a significantly reduced size, in particular in the radial direction, and the rings of which have entirely sufficient thicknesses both for forming correct abutments with the members on which the bearing must be mounted, or to which they are fixed, and to ensure a sufficient mechanical strength of the rings during heat treatment and during subsequent mechanical working.

According to the present invention there is provided a ball bearing comprising an outer ring, at least one inner ring and at least one ring of balls interposed between these rings, the said outer ring and the said inner ring being provided with at least an outer and an inner rolling track respectively, the surface of which, in section taken through the axis of the said rings, is an arc of a curve the normal to which at the mid point of the curve itself is inclined by a predetermined angle with respect to the said axis, in such a way that the direction of the forces transferred between each ball and the said tracks is inclined by the said angle with respect to the said axes, characterised by the fact that on the said inner ring there is formed an annular groove disposed on one side of the said inner track and the minimum diameter of which is less than the minimum diameter of the track itself, and on the said outer ring there is formed a substantially cylindrical seat disposed on one side of the said outer track and the diameter of which is less than the maximum diameter of the track, half the difference between the said diameter of the said seat and the said minimum diameter of the said groove being substantially equal to the diameter of the said ball.

BRIEF DESCRIPTION OF THE DRAWINGS

For a better understanding of the present invention a more detailed description is now given by way of example with reference to the Figures of the attached drawings, in which:

FIG. 1 is an axial section of a bearing of the present invention;

FIG. 2 represents a bearing of the preceding Figure during the assembly operation;

DETAILED DESCRIPTION OF THE INVENTION

Figure 3:
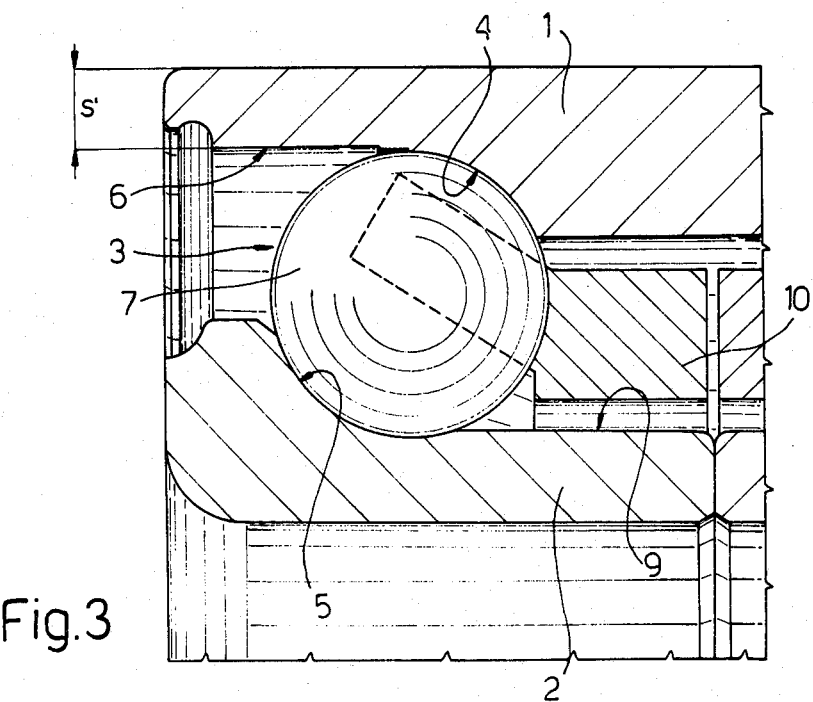
FIGS. 3 and 4 are axial sections of prior art bearings.

With reference to FIG. 1, the ball bearing of the invention is of the type comprising an outer ring 1, at least one inner ring 2 (in the case of the embodiment illustrated there are provided two such rings one in contact with the other), and at least one ring of balls 3 interposed between these rings; these are provided with an outer rolling track 4 and an inner rolling track 5 the surfaces of which give rise, in section taken through the axes of the said rings, to an arc of a curve the normal to which taken at the mid point of the curve itself, is inclined by a predetermined angle with respect to the axis of the bearing in such a way that the direction of the forces transferred between each ball and the said tracks is inclined with respect to the axis.

The outer ring 1 has a cylindrical surface 6 disposed on one side of the outer track 4, the diameter of which is substantially less than the maximum diameter of the track itself as is clearly seen in FIGS. 1 and 2. The minimum thickness S, measured in the radial sense, of this ring is substantially equal to the thickness of the rings of bearings of equal dimensions in which there are provided balls 7 the diameter of which is significantly less than that of the balls which are mounted on the bearing of the invention.

On the inner ring 2 there is formed an annular groove 8 on one side of the inner track 5, the minimum diameter of which is significantly less than the diameter of the said track as is clearly seen in the drawings; conveniently this groove is delimited by a surface which, in section on a diametral plane, gives a profile which includes a substantially rectilinear central section and two lateral curved sections. Moreover, on the same side of the groove 8 and beyond it there is disposed a cylindrical seat 9 the diameter of which is substantially greater than the minimum diameter both of the track 5 and the groove 8. On the basis of the geometrical characteristics first described, and the dimensions of the tracks and the first indicated groove it results that half of the difference between the diameter of the cylindrical surface 6 and the minimum diameter of the groove 8 is substantially equal to the diameter of the ball 7; similarly half the difference between the maximum diameter and the minimum diameter respectively of the tracks 4 and 5 is also equal to the diameter of the ball.

The bearing of the invention is now provided with a spacer cage 10 of any suitable type.

In FIG. 2 there is schematically shown the position of the inner and outer rings during the assembly of the bearing of the invention. To effect such assembly the balls 7 of the ring of balls 3 are substantially disposed within the groove 8 in such a way that they rest on the bottom of the groove itself as is shown in the drawing; simultaneously the spacer cage 10 is disposed in the correct position with respect to the balls. In this configuration, because of the equality between the diameters of the balls 7 and half of the difference between the diameter of the cylindrical surface 6 and the minimum diameter of the groove 8, the various balls are disposed exactly between the surface and the said groove completely filling the space between them as has been shown in FIG. 2, without leaving substantially any radial play. Subsequently the assembly constituted by the inner ring 2, the ring of balls 3 and the spacer cage are thrust axially towards the outer ring 1 in such a way as to constrain the ball 7 of the ring of balls 3 to roll simultaneously into the interior of the outer track 4 and the inner track 5 to assume the definitive configuration shown in FIG. 1. During this further displacement each ball of the ring of balls 3, as well as displacing axially, is also subjected to an outward radial displacement to carry the centres of the balls onto the circumference on which they must be located in the final configuration.

In this configuration the balls rest correctly on the surface of the outer track 4 and inner track 5, whilst the groove 8, now completely free, does not constitute an impediment for the regular operation of the bearing.

It is apparent that in the bearing of the invention balls 7 can be used the diameter of which is substantially greater than that of the balls which would be utilised in a bearing of the same type having the same dimensions. To take account of this fact it is sufficient to make reference to FIG. 3 in which there has been shown a conventional bearing of the same type having the same dimensions as that of the bearing of FIG. 1. In particular the minimum thickness S' of the outer ring 1 of this bearing is equal to the thickness S of the bearing of FIG. 1; in this conventional construction, however, the maximum diameter of the outer rolling track 4 is less than the diameter of the cylindrical surface 6, whilst the minimum diameter of the rolling track 5 is less than the diameter of the cylindrical seat 9 contiguous with the track itself.

Figure 4:
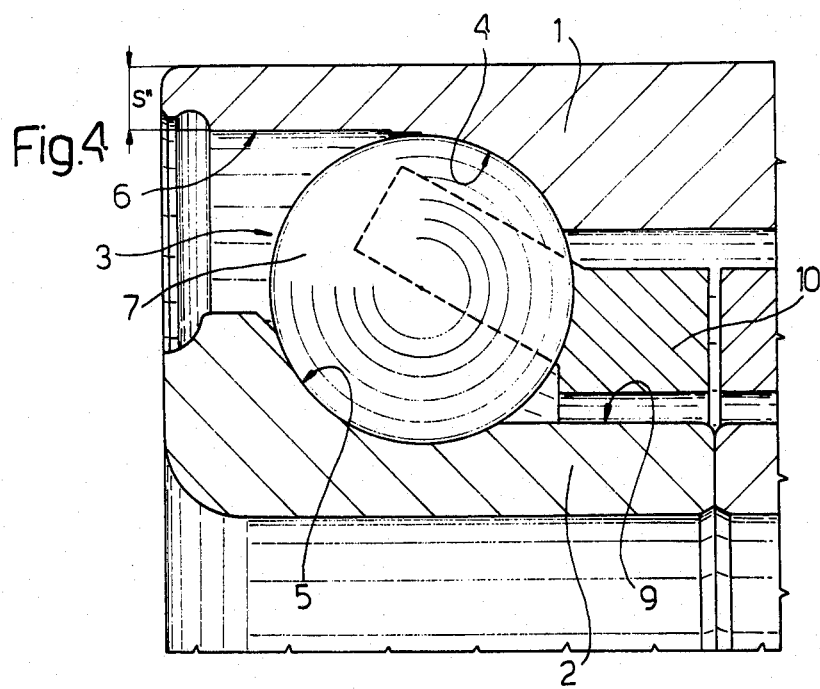

It is therefore evident that whenever, starting from a bearing as shown in FIG. 3, it is wished to increase the diameter of the balls, as has been shown in FIG. 4, for the purpose of being able correctly to house the balls between the rings it will be necessary to make a track 4 the maximum diameter of which is greater than that in the preceding case, and an inner track 5 the minimum diameter of which is less than that in the same case; in these conditions the centres of the balls will remain on the same circumference on which the balls of the bearing of FIG. 3 are located. From such constructional arrangement it follows, therefore, that the minimum thickness S" of the outer ring 1 is significantly reduced with respect to the thickness S' of the ring in the preceding case, with the consequence of making this excessively fragile during heat treatments and during mechanical working subsequent to these treatments.

With the constructional arrangement devised, on the other hand, with the bearing of the invention, it is possible to house between the outer ring 1 and the inner ring 2 balls 7 having the same diameter as those of the bearing of FIG. 4 and the centres of which are disposed substantially on the same circumference, without however having the disadvantages which have been mentioned above, and in particular being able to retain a minimum thickness S for the outer ring 1 of the bearing substantially equal to that of the thickness S' which the bearing of conventional type of FIG. 3 had, but having the same dimensions with balls of a significantly smaller diameter than those of the balls of the bearing of the invention.

The bearing of the invention can be made substantially in the same way as conventional bearings are constructed, since the presence of the groove 8 makes it entirely easy; in particular this groove, since it does not constitute a rolling track for the balls during normal operation of the bearings can have a coarser surface finish than that of the track themselves and therefore the bearing thus made can be produced substantially at the same cost as conventional bearings.

It is evident that the embodiments of the bearing of the invention described can be modified and varied, both as to form and to arrangement of the various parts, without departing from the scope of the invention itself. In particular the concept utilised for being able to lodge a ring of balls of large dimensions between two rings of a ball bearing can be employed for the construction of bearings having a different structure from that which has been illustrated, for example for constructing radial bearings of conventional type rather than oblique bearings as has, on the other hand been shown in the attached drawings.

We claim:

1. In a ball bearing comprising an outer ring having an axis, a first inner ring and a first row of balls arranged therebetween, said outer ring having a first outer rolling track for guiding said balls of said first row and said first inner ring having an inner rolling track for guiding said balls of said first row, said first outer rolling track and said inner rolling track having curved profiles in a radial plane perpendicular to said axis, the line connecting the midpoint of said first outer rolling track profile and the center of said balls being disposed at a first predetermined angle relative to said axis and the line connecting the midpoint of said inner rolling track profile and the center of said balls being disposed at a second predetermined angle relative to said axis, said inner ring further having an annular groove formed on one side of said inner rolling track, the minimum diameter of said annular groove being less than the minimum diameter of said inner rolling track, and said outer ring further having a substantially cylindrical seat formed on one side of said first outer rolling track, the diameter of said seat being less than the maximum diameter of said outer rolling track, the improvement wherein said inner ring further has a substantially cylindrical surface contiguous with said annular groove, the diameter of said substantially cylindrical surface of said first inner ring being greater than said minimum diameter of annular groove.

2. The ball bearing as defined in claim 1, further comprising a second inner ring and a second row of balls arranged between said second inner ring and said outer ring, said second inner ring having an inner rolling track for guiding said balls of said second row and said outer ring having a second outer rolling track for guiding said balls of said second row.

* * * * *